Nov. 17, 1959 G. G. GIVENS 2,913,260
CABLE STUFFING TUBES
Filed Nov. 26, 1952
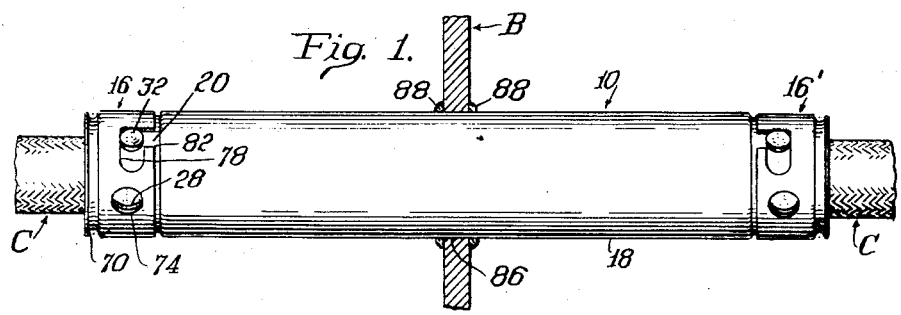
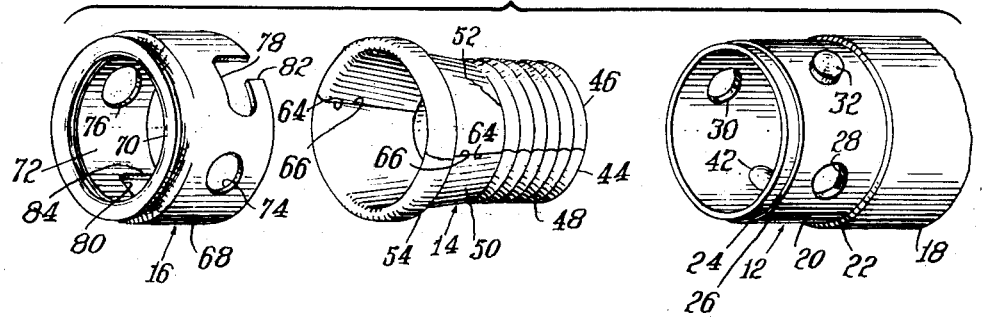
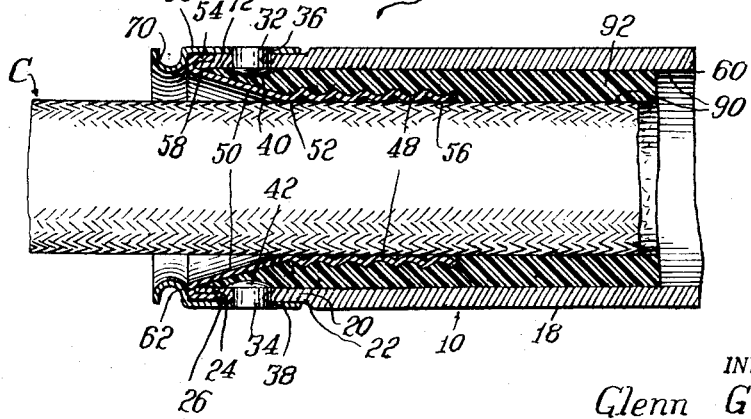
INVENTOR.
Glenn G Givens
BY
ATTORNEYS

United States Patent Office 2,913,260
Patented Nov. 17, 1959

2,913,260

CABLE STUFFING TUBES

Glenn G. Givens, Newport News, Va.

Application November 26, 1952, Serial No. 322,694

6 Claims. (Cl. 285—158)

The present inventon relates to improvements in cable stuffing tubes and more particularly to cable stuffing tubes of the type adapted to sealingly pass a cable through a bulkhead or the like.

In the prior art it has been the practice to provide stuffing tubes for cables wherein an outer cylindrical tube is provided for securement in place through an opening in a bulkhead, deck, or the like, on board ship, or in corresponding structure on shore installations. The cylindrical tube receives the cable therethrough and the usual fibrous stuffing is packed in the annular space surrounding the cable within the tube and threaded elements are engaged within the ends of said tube to compress the fibrous stuffing against the periphery of the cable. The fibrous stuffing in most instances is rope-like although loose fibrous packing and other compressible packing are being employed.

The difficulty encountered with such prior art structures is that the threading of the cooperating tube and end elements renders the same expensive of manufacture. Similarly the inside surface of the tube must usually be provided with annular shoulders against which the end elements are adapted to compress the stuffing and such shoulders also materially add to the cost of the stuffing tube.

Another objection raised with regard to those stuffing tubes employing rope-like or other fibrous stuffing is that such stuffings cannot be compressed so as to be evenly distributed over the surface of the cable and the result is poor sealing qualities. Furthermore, the difference in pressures on opposite sides of a bulkhead on shipboard, for example, is quite great at times and fibrous packing may leak under such circumstances because of the unevenness. In this connection, it will be noted that in order to obtain a reasonably effective seal with fibrous-type packings, great care, which of course is time consuming, must be exercised in placing the packing or stuffing in place.

Corrosion of the cable within such stuffing tube is also prone to occur.

From the coregoing it will be obvious that a great need has existed for an improved stuffing tube that would overcome the difficulties being encountered with prior art arrangements. Furthermore, present day shipboard requirements have made it mandatory that a suitable stuffing tube be provided which will be suitable for use under existing conditions.

Accordingly, it is a primary object of the present invention to provide an improved cable stuffing tube which will obviate the difficulties and overcome the objections existing with regard to prior art stuffing tubes.

Another object of the present invention is to provide an improved cable stuffing tube which will be relatively inexpensive of manufacture and which will also be adapted to be installed with facility and yet which will provide uniform and effective sealing under the conditions contemplated.

A further object of the present invention is to provide an improved cable stuffing tube which will be of such structural form as to be readily installed by inexperienced personnel with a minimum possibility that an unsatisfactory seal will be made.

A still further object of the present invention is to provide an improved cable stuffing tube that will be completely impervious to moisture, vermin-proof and capable of withstanding high pressure differentials between opposing ends thereof.

Still another object of the present invention is to provide an improved cable stuffing tube that will be of a substantially permanent nature so that periodic tightening or replacement will be unnecessary.

Various other objects and advantages will become apparent from the detailed description to follow.

The best form in which I have contemplated applying my invention is clearly illustrated in the accompanying drawings wherein:

Figure 1 is a side elevational view of my improved cable stuffing tube in place in an opening in a bulkhead with a cable sealingly passing therethrough;

Figure 2 is an enlarged perspective exploded view showing the several elements of which one end of my improved cable stuffing tube is comprised; and Figure 3 is an enlarged longitudinal sectional view through one end of my improved cable stuffing tube and showing the sealing compound in the annular spacing between the cable and the tube or pipe.

Referring more particularly to the drawings, it will be seen that my improved cable stuffing tube 10 is comprised of tubular means 12, end closure means 14 for each end of the tubular means 12, and a retaining cap 16 for each end of the tubular means to hold the end closure means in position.

The tubular means 12 is comprised of a tube or heavy pipe 18 of metal or other suitable material, preferably metal having electrical conductive properties so as to be able to ground the cable C at each bulkhead where it passes through the stuffing tube. Figures 2 and 3 show the details of one end of the tube or pipe 18 and it will be understood that the opposing end is of similar construction so that a description of one end will suffice.

The pipe or tube 18 is formed with a first reduced diameter portion 20 providing a shoulder at 22 and a second further reduced diameter end portion 24 providing a shoulder at 26, the length of the portion 24 as measured along the longitudinal being considerably less than that of the portion 20. The portion 20 has a pair of diametrically opposed, aligned openings 28 and 30 extending through the tubular wall thereof. Circumferentially spaced from the openings are provided two diametrically opposed guide pins 32 and 34 which extend through openings 36 and 38 with their headed ends 40 and 42 disposed inwardly and their shanks disposed outwardly of the surface of the portion 20 by an amount substantially equal to the depth of the shoulder 22.

The closure means 14, in its preferred form, is comprised of a pair of sections 44 and 46 which, when placed together, provide a substantially cylindrical portion 48 which is corrugated or ribbed, a substantially smooth conical portion 50 extending outwardly from one end 52 of the cylindrical portion 48, and a turned-back annular portion at 54. The closure means sections are preferably formed of thin, electrically conductive metal. The inside diameter 56 of the cylindrical portion 48 is approximately equal to the outside diameter of the cable C, whereas the outside diameter 58 of the larger end of the conical portion is substantially equal to the inside diameter 60 of the pipe 18 so that the sections are snugly received in the pipe and snugly receive the cable therethrough. The spacing between the turned-back portion 54 and the outside of the conical portion at 58 is such that the portion 24 of the tube or pipe 18 can be snugly received therein with the end edge 62 of the turned-back portion engaged against the shoulder at 26.

The edges 64 and 66 where the sections are separated are adapted to abut each other in the assembled relationship of Figures 1 and 3 but if desired an overlap can be effected.

The retaining cap 16 has the major length thereof substantially cylindrical at 68 and the minor portion thereof annularly arcuated at 70 so as to provide an outwardly facing circumferential groove. The groove 70 may be utilized receiving a cable support thereabout, if desired. The inside diameter 72 of the cylindrical portion 68 is substantially equal to the outside diameter of the turned-back portion 54 and the portion 20 of the tube 18.

As seen best in Figure 2, the cap 16 has a pair of aligned, diametrically opposed openings 74 and 76 of a diameter substantially equal to that of the openings 28 and 30. The cap is additionally provided with the bayonet-type slots 78 and 80 which are circumferentially spaced from the openings 74 and 76. The open ends 82 and 84 of the slots 78 and 80 are so spaced from the openings 74 and 76 as to align the openings 74 and 76 with the openings 28 and 30, respectively, when the pins 32 and 34 are received in the openings 82 and 84, as shown in Figure 1. Of course, relative rotation between the cap and end of the tube with the pins in the bayonet-type slots will close communication between the apertures.

When it is desired to pass a cable C through a metal bulkhead B, for example, the bulkhead is first formed with an opening 86 and the tube 18 is positioned therein and welded at 88. The caps 16 and 16' are mounted on the ends of the tube for convenience and the cable C is then passed therethrough. The caps are next removed from the ends of the tube and at each end the pair of closure sections 44 and 46 are positioned about the cable with the turned-back portions received on the tube portion 24. The caps are repositioned on the ends of the tube with the pins on the latter being received in the openings of the bayonet-type slots, as seen in Figure 1. The openings through the caps and the tube ends will be aligned and the cable will be relatively firmly maintained axially of the tube with an annular space 90 between the cable and tube.

A sealing compound 92, such as is presently available on the market, having physical characteristics, as thermal expansion coefficient and other properties, suitable for the conditions to be encountered is selected. This compound may be a plastic, for example, that sets upon cooling and remains set. An injector apparatus, not shown, which has a pair of injector nozzles is employed and it will be understood that the injector element constitutes no part of the instant invention but on the contrary can assume any form adapted for the purpose intended. The sealing compound, which is in a semi-plastic state is injected by the pair of nozzles at opposing sides of the cable through the aligned openings until the annular space 90 is completely filled, the pressure of the sealing compound within the annular space is such as to exert pressure on the conical and cylindrical portions of the closure sections, thereby tightly gripping the cable at the ribbed portion. Preferably the compound is injected through the opposing sets of aligned openings so that the pressure of the compound entering the space about the cable will not be greater on one side of the cable than on the other. When the compound is injected only at one side of the cable the pressures deflect the cable and unsatisfactory results have occurred. Of course, the compound can be injected from both ends of the tube or from one end, the other end being kept open until the air has been expelled.

In its semi-plastic state, the compound fills all the crevices achieving an intimate contact with all exposed surfaces. When the compound has set, it is bonded to all of these exposed surfaces giving optimum sealing qualities that will last indefinitely.

The cable stuffing tube of the present invention can be made in the various sizes necessary to fit various size cables.

From the foregoing, it will be seen that I have provided an improved cable stuffing tube extremely well adapted for shipboard usage although I do not wish to be limited to such usage. The cable will be under even pressure throughout its length within the tube; the seal will be even; corrosion will be impossible; the tube will be vermin proof; an effective fire and pressure seal will be provided; and, the cable will be grounded at every bulkhead. Other features are readily apparent.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A cable stuffing tube comprising a substantially cylindrical tube adapted to be fixed in a wall through which a cable is to be passed, sectional end closure means for each end of said tube, and retaining means for holding each sectional end closure means in preselected relation to its associated end of the tube and in clamping relation to a cable passing therethrough, each sectional end closure means including complemental half sections presenting at one end a substantially cylindrical gripping portion, a centrally located conical portion flaring outwardly from the cylindrical gripping portion, and terminating at the other end in a turned-back annular portion, said complemental half sections of each end closure means being inserted within one end of said tube with the turned-back portions thereof embracing the end edge of the same whereby the half sections are maintained in engagement to clamp upon a cable passing therethrough, said retaining means including a generally cylindrical cap received on each end of the tube and having an inside diameter substantially the same as the outer surface of the turned-back portion of the sectional closure means and having at one end an inwardly projecting portion abutting the closure means and maintaining the turned-back portion engaged upon the end of the tube, said cap having a bayonet slot in its other end and there being a pin carried by said tube engaged in the bayonet slot to retain the cap on the tube.

2. A cable stuffing tube comprising a substantially cylindrical tube adapted to be fixed in a wall through which a cable is to be passed, sectional end closure means for each end of each tube, and retaining means for holding said sectional end closure means in preselected relation to its associated end of the tube and in clamping relation to a cable passing therethrough, each sectional end closure means including complemental half sections presenting at one end a substantially cylindrical corrugated gripping portion, a substantially conical portion flaring outwardly from the gripping portion, and terminating at the other end in a turned-back annular portion, each end of the tube terminating in a portion of reduced diameter and said turned-back annular portion of each end closure means receiving its associated tube end portion of reduced diameter with the outer surface of the turned-back portion substantially flush with the adjacent end portion of the tube, said retaining means including a generally cylindrical cap received on each end portion of the tube and having an inside diameter substantially the same as the outer surface of the turned back portion and the adjacent end portion of the tube and having at one end an inwardly projecting portion abutting the closure means and maintaining the turned back portion engaged upon the reduced end of the tube, said end cap having a bayonet slot in its other end and there being a pin carried by said tube engaged in the bayonet slot to retain the cap on the tube.

3. A cable stuffing tube comprising a substantially cylindrical tube adapted to be fixed in a wall through which a cable is to be passed, end closure means for each end of said tube, and retaining means for holding each end closure means on its associated end of the tube, each end closure means including a cylindrical portion clampingly engaging an associated cable, each end portion of said tube having a pair of oppositely disposed openings therethrough, at least one pin carried by said tube intermediate each pair of openings, said retaining means having oppositely disposed openings through the walls thereof both of which are simultaneously registrable with the openings in said tube and adapted to have sealing compound injected therethrough to fill the annular space about the cable within the tube, and slots in said retaining means cooperable with said pins permitting relative rotation therebetween for the selective registration of said openings.

4. A cable stuffing tube comprising a substantially cylindrical tube adapted to be fixed in a wall through which a cable is to be passed, sectional end closure means for each end of said tube, and retaining means for holding each sectional end closure means in preselected relation to its associated end of the tube and in clamping relation to a cable passing therethrough, each sectional end closure means including complemental half sections presenting at one end a substantially cylindrical gripping portion, a centrally located conical portion flaring outwardly from the cylindrical gripping portion, and terminating at the other end in a turned-back annular portion, said complemental half sections of said end closure means being inserted within one end of said tube with the turned-back portions thereof embracing the end edge of the same whereby the half sections are maintained in engagement to clamp upon a cable passing therethrough, said retaining means including a generally cylindrical cap received on each end portion of the tube and having an inside diameter substantially the same as the outer surface of the turned-back portion of the sectional closure means and having at one end an inwardly projecting portion abutting the closure means and maintaining the turned-back portion engaged upon the end of the tube, said cap and tube inwardly of the turned-back portion of the sectional closure means having interlocking means retaining the cap on the tube.

5. In combination, a partition wall having an opening therein, an elongate tube fixed in said wall and projecting beyond the opposite sides thereof, a cable of less diameter than the inner diameter of the tube extending therethrough and beyond each end of the tube and providing a space therein around the cable, a sealing sleeve of less length than the tube disposed in each end of the tube, each sleeve being longitudinally divided to permit the same to be engaged over a corresponding projecting end of the cable to surround the same without requiring the cable to be threaded through such sleeve, each sleeve having an outer end portion of substantially the same diameter as the inner diameter of the tube and engaged completely circumferentially therewith to effect complete circumferential engagement therewith, each sleeve also including an inner end portion of substantially less diameter than the outer end portion thereof and approximately equal to the diameter of the cable and engaged completely circumferentially therearound and with the divided portions of the sleeve being in engagement throughout their lengths whereby each sleeve forms an end closure for the tube to define an isolated chamber therewithin, plastic means introduced into said isolated chamber and filling the same to engage the exterior of the sleeves and maintain the inner ends thereof in permanent engagement with the cable to provide a seal preventing gases and the like from passing through the tube, and retaining means maintaining said outer end portions of the sleeves in engagement with the inner surface of the tube.

6. The combination as defined in claim 5 wherein the outer terminal portion of each sleeve is turned back upon itself and is engaged over its corresponding end of the tube, each retaining means serving to maintain such turned-back portions in engagement over the corresponding ends of the tube.

References Cited in the file of this patent

UNITED STATES PATENTS

| | | |
|---|---|---|
| 1,066,935 | McDaniel | July 8, 1913 |
| 1,135,376 | Hooker | Apr. 13, 1915 |
| 1,251,438 | Stone | Dec. 25, 1917 |
| 1,268,978 | Kinnear | June 11, 1918 |
| 1,586,923 | Townsend | June 1, 1926 |
| 1,805,155 | Weeks | May 12, 1931 |
| 1,823,234 | Bell | Sept. 15, 1931 |
| 2,014,635 | Polgov | Sept. 17, 1935 |
| 2,046,124 | Kleeramp | June 30, 1936 |
| 2,100,824 | Wayman | Nov. 30, 1937 |
| 2,236,863 | Williams et al. | Apr. 1, 1941 |
| 2,238,709 | Schraig | Apr. 15, 1941 |
| 2,277,637 | Eby | Mar. 24, 1942 |
| 2,478,082 | Broske | Aug. 2, 1949 |
| 2,504,936 | Payne | Apr. 18, 1950 |
| 2,523,716 | Parr | Sept. 26, 1950 |
| 2,624,601 | Else | Jan. 6, 1953 |
| 2,733,939 | Scherer | Feb. 7, 1956 |

FOREIGN PATENTS

| | | |
|---|---|---|
| 17,007 | Great Britain | July 31, 1896 |
| 9,752 | Great Britain | Apr. 25, 1913 |
| 605,805 | France | June 2, 1926 |
| 342,623 | Great Britain | Feb. 5, 1931 |
| 401,318 | Great Britain | Nov. 6, 1933 |